United States Patent [19]
Corzine

[11] Patent Number: 4,750,762
[45] Date of Patent: * Jun. 14, 1988

[54] AXIALLY SPLIT CLAMP FOR PUSH-ON COUPLINGS

[76] Inventor: George S. Corzine, 2556 Barrett Ave., Naples, Fla. 33962

[*] Notice: The portion of the term of this patent subsequent to Mar. 1, 2005 has been disclaimed.

[21] Appl. No.: 112,286

[22] Filed: Oct. 26, 1987

Related U.S. Application Data

[63] Continuation-in-part of Ser. No. 2,437, Jan. 12, 1987, abandoned.

[51] Int. Cl.⁴ ............................................. F16L 21/06
[52] U.S. Cl. ...................................... 285/45; 285/318; 285/347; 285/351
[58] Field of Search ................. 285/318, 45, 387, 388, 285/353, 351, 384, 347

[56] References Cited

U.S. PATENT DOCUMENTS

| | | | |
|---|---|---|---|
| 4,055,359 | 10/1977 | McWethy | 285/318 X |
| 4,350,372 | 9/1982 | Logsdon | 285/45 |
| 4,486,036 | 12/1984 | Storke et al. | 285/347 X |
| 4,580,788 | 4/1986 | Rabe et al. | 285/349 X |

FOREIGN PATENT DOCUMENTS 817739 10/1951 Fed. Rep. of Germany ........ 285/45

Primary Examiner—Thomas F. Callaghan
Attorney, Agent, or Firm—Merrill N. Johnson

[57] ABSTRACT

An axially split clamp for securing the connection between a push-on fitting having a flared end fitted into a cage and surrounded by a garter-type coiled spring housed within the cage on a pipe having a plurality of O-rings sealing the connection between the push-on fitting and the pipe. The two mirror image halves of the axially split clamp are sized to snugly encircle the cage housing the coiled spring of the pipe while at the same time snugly encircling the adjacent outer surface of the push-on fitting. The two halves of the clamp are then securely joined together by a pair of screws threaded into aligned threaded holes in both halves of the clamp.

3 Claims, 1 Drawing Sheet

AXIALLY SPLIT CLAMP FOR PUSH-ON COUPLINGS

This application is a continuation-in-part of my earlier application Ser. No. 002,437 filed Jan. 12, 1987 and now abandoned.

BACKGROUND AND SUMMARY OF THE INVENTION

The invention lies in the field of fluid line couplings and particularly couplings using push-on fittings of the type shown in Ford Motor Company's U.S. Pat. No. 4,055,359. My invention provides a unique axially split-clamp which improves the sealing of couplings utilizing push-on fittings.

When the Ford Motor Company began using its patented push-on fittings with garter-type coil springs on its vehicle air conditioning fluid lines and fuel lines, it created a vehicle service industry problem that until recently could be solved only by buying and installing new Ford-made components. The problem continues to be acute due to the high incidence of failure of the O-rings used to seal the connection between the push-on fitting and the pipe to which it is coupled.

The end of the push-on fitting is flared and sized to fit into a cage which houses a garter-type coiled spring. The fitting is pushed onto the pipe and over the O-rings on the end of the pipe until the flared end of the fitting enters the cage and forces the coil spring over the flared end of the pipe and down to encircle the fitting. The spring now prevents the fitting from being pulled out of the cage. Fluid under pressure is sealed within the line by the O-rings between the pipe and the push-on fitting.

Push-on fittings are used to connect a flexible hose to the condenser, the evaporator, the accumulator and the compressor of the air conditioning system and also for connections to the gasoline tank and the carburetor of the vehicle's fuel system.

The fluid lines of vehicle air conditioning systems conventionally operate with line pressures of at least 100 p.s.i. and, at high ambient temperatures, line pressures of 300 p.s.i. are not uncommon. These pressures put severe strain upon the seal between the push-on fitting and the pipe to which the fitting is coupled.

The high incidence of O-ring failures results from high line pressures and the fact that the push-on fitting is usually on one end of a length of flexible hose. Constant vibration and movement of the flexible hose during running of the vehicle's engine and the vehicle itself forces the fitting to move back and forth transverse to its axis, causing wear and eventual rupture of the seal between the O-rings and the inner surface of the push-on fitting.

The locking assembly shown and described in my earlier application Ser. No. 002,437 filed Jan. 12, 1987 pushes the flared end of the fitting firmly against the inside of the cage, holds the push-on fitting in axial alignment with the pipe to which the fitting is coupled and, in addition, puts a 360° inwardly directed pressure on the seal between the O-rings and the inner surface of the fitting. That assembly includes two major components: a male fitting and a uniquely shaped locking nut, both of which are axially sawed apart into two mirror-image halves.

The unique locking assembly described in my earlier application Ser. No. 002,437 does a perfect long term job of preventing leaking and eventual failure of the seal provided by the O-rings of the push-on coupling.

Instead of using the aforementioned locking assembly, some improvement in the sealing of couplings utilizing Ford push-on fittings can be achieved by using my unique axially split clamp. Each half of my axially split clamp contains a semi-annular recess designed to fit snugly over the cage housing the coiled spring of the pipe and an adjacent semi-circular surface having the same diameter as the outer surface of the push-on fitting adjacent the cage. The two halves of the clamp each contain a pair of mutually aligned threaded holes sized to receive a pair of screws for joining the two halves together.

In order to prevent engine vibration and vehicle movement from eventually rupturing the seals maintained by the two O-rings of the coupling, the two halves of my axially split clamp are placed around the coupled pipe and push-on fitting. The semi-annular recesses of the two clamp halves are placed over the cage of the pipe and the clamps semi-circular surfaces are engaged with the outer surface of the push-on fitting. Two screws are then threaded into the two aligned holes in the clamp halves to draw the two halves securely together, thereby locking the couplings' pipe and fitting into axial alignment.

DETAILED DESCRIPTION OF THE PREFERRED EMBODIMENTS

Figure 1:
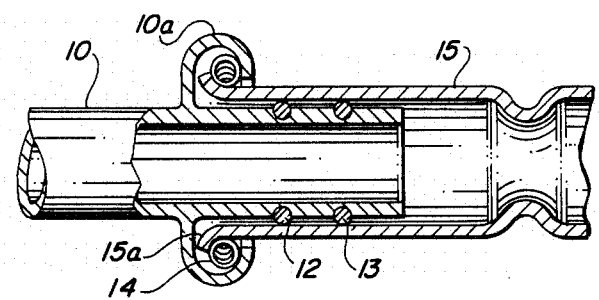
FIG. 1 is an elevational view partially in cross-section showing a conventional Ford Motor Company push-on fitting coupled to a caged garter-type coil spring mounted on an air conditioning condenser pipe.

Referring first to FIG. 1 of the drawings, there is shown a conventional "quick connect' push-on compling of the type shown in Ford Motor Company's U.S. Pat. No. 4,055,359 and used extensively since 1980 by the Ford Motor Company on most of its vehicle refrigerant lines and some of its fuel lines. Condenser pipe 10 includes a cage 10a which houses a garter-type coil spring 14. A flexible hose (not shown) is connected to pipe 10 by push-on fitting 15 which has an outwardly flaring end 15a. In practice, fitting 15 is pushed onto the end of pipe 10 and over O-rings 12 and 13 which are fitted into semi-circular grooves in the end of pipe 10 as shown in FIG. 1. O-rings 12 and 13 are preferably made of synthetic rubber or similar resilient material.

As the flared end 15a of fitting 15 is pushed over the end of pipe 10 and into cage 10a, spring 14 will be forced up and over the flared end of fitting 15. The spring now prevents the removal of fitting 15 from the cage without the use of a special tool. However, the fluid under pressure within the condenser and hose, which pressure is usually at least 100 p.s.i. and ofter much more, is sealed only by O-rings 12 and 13. Continual transverse movement between pipe 10 and fitting 15 due to engine vibration and vehicle travel over rough roads and frequent temperature changes over several hundred degreees fahrenheit tend to cause frequent failure of O-ring seals 12 and 13.

Figure 2:
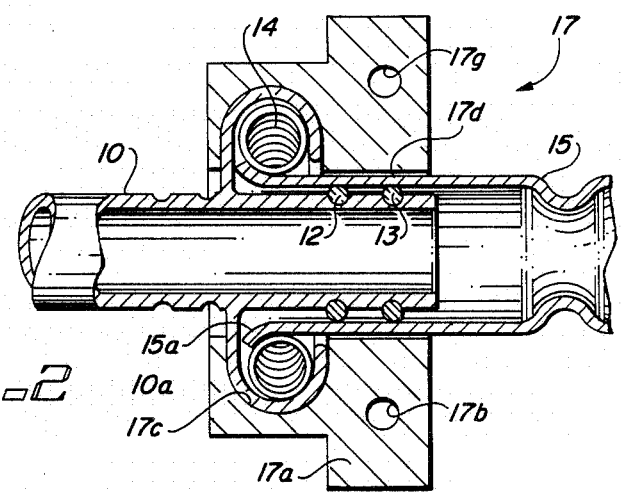
FIG. 2 is an elevational view largely in cross-section showing one embodiment of my axially split clamp.
Figure 3:
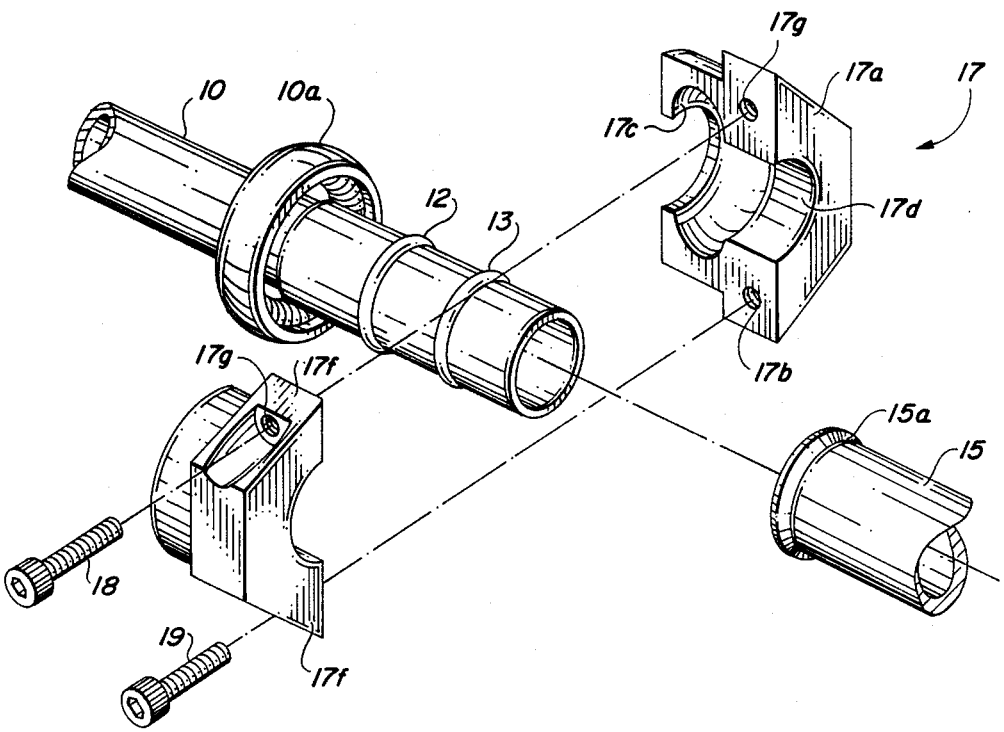
FIG. 3 is an exploded view of the components of my axially split clamp shown in FIG. 2.

FIGS. 2 and 3 illustrate one preferred embodiment of my unique axially split clamp for preventing early failure of the seal provided by conventional push-on fitting connections such as shown in FIG. 1. FIG. 2 illustrates my two part clamp installed on the push-on fitting coupling shown in FIG. 1. The components of the conventional coupling illustrated in FIG. 2 bear the same identifying numeral used in FIG. 1. FIG. 3 is an exploded view of the components of my clamp; namely, clamp 17, which is axially sawed in half prior to use, and screws 18 and 19.

Clamp 17 is manufactured as a single piece and then axially sawed in half into two mirror-image clamp halves 17a and 17f as best shown in FIG. 3. Clamp 17 includes a semi-annular recess 17c shaped and sized to fit snugly over pipe cage 10a and also includes an adjacent cylindrical surface 17d having the same diameter as the outer surface of fitting 15 adjacent to cage 10a. In addition clamp 17 includes two threaded holes 17b and 17g which run through the clamp at right angles to the axis of the clamp. A pair of allen head screws 18 and 19 are threaded into holes 17b and 17g to join clamp halves 17a and 17f together.

To prevent engine vibration, vehicle movement and/or extreme variations in operating temperature from rupturing the seal between O-rings 12 and 13 and the inner surface of push-on fitting 15, my axially split clamp 17 is installed over pipe 10 and fitting 15 as shown in FIGS. 2 and 3. The recess 17c of the two halves 17a and 17f of the clamp is fitted over cage 10a and the clamp's cylindrical surface 17d is pressed firmly against the adjacent outer surface of push-on fitting 15. Screws 18 and 19 are then screwed into threaded holes 17b and 17g to securely join the two clamp halves together, thereby holding pipe 10 and push-on fitting 15 in strict axial alignment and at the same time exerting a strong 360° inward pressure on push-on fitting 15.

While my clamp 17 does not include a fitting which will maintain flange end 15a firmly against the inner surface of cage 10a as is the case of my locking assembly shown in my prior application Ser. No. 002,437, my clamp does improve the life of the seal provided by O-rings 12 and 13 for the reasons set forth above.

I have shown and described one embodiment of my unique clamp for use with push-on couplings. Various changes and modifications of my clamp will be apparent to those skilled in the art without departing from the spirit of my invention. Accordingly, no limitation should be inferred from the foregoing description since the scope of the invention is defined only in the appended claims.

I claim:

1. A clamping assembly for securing the connection between a push-on fitting having a flared end fitted into a cage and surrounded by a garter-type coil spring housed within the cage of a pipe with an O-ring sealing the connection between the push-on fitting and the pipe comprising
    a clamp for encircling the cage of the pipe and the outer surface of the push-on fitting adjacent the cage,
    said clamp having a semi-annular recess aligned about the central axis of the clamp and sized to snugly fit over the cage of the pipe,
    said clamp also having an axially aligned cylindrical surface with a diameter sized to fit snugly over the outer surface of the push-on fitting adjacent the cage of the pipe,
    said clamp also having a pair of threaded holes whose axes lie transverse to the axis of the clamp and lying on opposite sides of the clamp's cylindrical surface,
    said clamp being axially split into two mirror-image halves, and
    a pair of screws sized to fit into the threaded holes in the clamp,
    whereby a strong, inwardly directed substantially 360° pressure is applied to the outer surface of the push-on fitting thereby locking the pipe and push-on fitting in strict axial alignment, preventing back and forth movement of said fitting and said pipe transverse to their axes, and preventing rupture of the O-ring seal between said fitting and said pipe.

2. A clamping assembly for securing the connection between a push-on fitting having a flared end fitted into a cage and surrounded by a garter-type coil spring housed within the cage of a pipe with a resilient O-ring sealing the connection between the push-on fitting and the pipe comprising
    a clamp for encircling the cage of the pipe and the outer surface of the push-on fitting adjacent the cage,
    said clamp having a semi-annular recess aligned about the central axis of the clamp and sized to snugly fit over the cage of the pipe,
    said clamp also having an axially aligned cylindrical surface with a diameter sized to fit snugly over the outer surface of the push-on fitting adjacent the cage of the pipe,
    said clamp also having a pair of threaded holes whose axes lie transverse to the axis of the clamp and lying on opposite sides of the clamp's cylindrical surface,
    said clamp being axially split into two mirror-image halves, and
    a pair of screws sized to fit into the threaded holes in the clamp,
    whereby a strong, inwardly directed substantially 360° pressure is applied to the outer surface of the push-on fitting thereby locking the pipe and push-on fitting in strict axial alignment, preventing back and forth movement of said fitting and said pipe transverse to their axes, and preventing rupture of the O-ring seal between said fitting and said pipe.

3. A clamping assembly for securing the connection between a push-on fitting having a flared end fitted into a cage and surrounded by a garter-type coil spring housed within the cage of a pipe with a plurality of resilient O-rings sealing the connection between the push-on fitting and the pipe comprising
    a clamp for encircling the cage of the pipe and the outer surface of the push-on fitting adjacent the cage,
    said clamp having a semi-annular recess aligned about the central axis of the clamp and sized to snugly fit over the cage of the pipe,
    said clamp also having an axially aligned cylindrical surface with a diameter sized to fit snugly over the outer surface of the push-on fitting adjacent the cage of the pipe,
    said clamp also having a pair of threaded holes whose axes lie transverse to the axis of the clamp and lying on opposite sides of the clamp's cylindrical surface,
    said clamp being axially split into two mirror-image halves, and
    a pair of screws sized to fit into the threaded holes in the clamp,
    whereby a strong, inwardly directed substantially 360° pressure is applied to the outer surface of the push-on fitting thereby locking the pipe and push-on fitting in strict axial alignment, preventing back and forth movement of said fitting and said pipe transverse to their axes, and preventing rupture of the O-rings' seal between said fitting and said pipe.

* * * * *